United States Patent [19]

Hall et al.

[11] Patent Number: 5,287,510
[45] Date of Patent: Feb. 15, 1994

[54] METHOD FOR IMPROVING THE EFFICIENCY OF ARITHMETIC CODE GENERATION IN AN OPTIMIZING COMPILER USING MACHINE INDEPENDENT UPDATE INSTRUCTION GENERATION

[75] Inventors: Charles B. Hall, Toronto, Canada; Peter W. Markstein, Austin, Tex.; J. Kevin O'Brien, Scarborough, Canada

[73] Assignee: International Business Machines Corporation, Armonk, N.Y.

[21] Appl. No.: 653,842

[22] Filed: Feb. 11, 1991

[30] Foreign Application Priority Data

Feb. 14, 1990 [CA] Canada ................................. 2010056

[51] Int. Cl.$^5$ ............................................. G06F 9/44
[52] U.S. Cl. ............................. 395/700; 364/DIG. 1; 364/280; 364/280.4; 364/280.5; 364/251.1; 364/251
[58] Field of Search ................................ 395/700, 650

[56] References Cited

U.S. PATENT DOCUMENTS

| | | | |
|---|---|---|---|
| 4,802,091 | 1/1989 | Cocke et al. | 395/700 |
| 5,109,331 | 4/1992 | Ishida et al. | 395/375 |
| 5,146,594 | 9/1992 | Iitsuka | 395/700 |
| 5,170,465 | 12/1992 | McKeeman et al. | 395/700 |
| 5,182,806 | 1/1993 | McKeeman et al. | 395/700 |

OTHER PUBLICATIONS

Fischer, Charles N. et al., Crafting A Compiler, The Benjamin/Cummings Series in Computer Science, 1988, pp. 551-641.
Anklam, Patricia et al., Engineering A Compiler, 1982, pp. 123-137.

*Primary Examiner*—Kevin A. Kriess
*Attorney, Agent, or Firm*—Wayne P. Bailey

[57] ABSTRACT

This invention provides a process within an optimizing compiler for transforming code to take advantage of update instructions available on some computer architectures. On architectures which implement some form of autoindexing instructions or addressing modes, this process will improve the code generated for looping constructs which manipulate arrays in memory. The process is achieved by selecting memory referencing instructions inside loops for conversion to update forms, modifying those instructions to an update form available on a particular processor, and applying an offset compensation to other memory referencing instructions in the loop so as to enable the program to still address the appropriate locations while using the available autoindexing instructions. The improved compiler and compiler process enables the compiler to convert those program instructions that would otherwise convert to autoindexing instructions not supported by the processor to autoindexing instructions that are supported.

45 Claims, 8 Drawing Sheets

```
int *p;
. . .
for (i=0; i<32; i++)     /* For 32 memory locations */
{
    *p++=0;              /* Store a 0, post increment pointer */
}
```

FIG. 2 for:

```
  . . .
  MOV    #0, (R5)  ; Store a 0 in memory pointed to by R5
  ADD    #2, R5    ; adjust R5 to next memory location
  . . .
```

FIG. 3 for:

```
  . . .
  MOV    #0, (R5)+ ; Store a 0 in memory pointed to by R5
                   ; and adjust R5 to next memory location
  . . .
```

FIG. 4

```
long a[10], b[10], c[10];
...
i=0;
while (i<10)
{
    a[i]=0;
    x=b[i];
    if (x == 0)
        break;
    if (x == 1)
        c[i]=1;
    else
        c[i]=2;
    i++;
}
```

FIG. 9

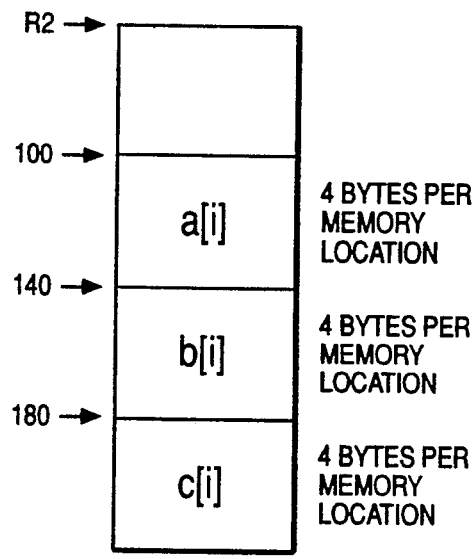

FIG. 10

```
        LI      R3=0                    ; set induction variable i to 0
while:
        MULT    R4=R3, 4
        ST      a(R2,R4,100)=0          ; store 0 into a[i]
        L       R5=b(R2,R4,140)         ; x gets a value from b[i]
        CMPI    R5,0
        BEQ     endwhile                ; exit loop if x == 0
        CMPI    R5,1
        BNEQ    else
        ST      c(R2,R4,180)=1          ; store 1 into c[i] if x ==1
        B       endif
else:
        ST      c(R2,R4,180)=2          ; store 2 into c[i] if x !=1
endif:
        ADDI    R3=R3,1                 ; post increment induction variable
        CMPI    R3,10
        BLT     while
endwhile:
```

FIG. 11

```
        LR      R6=R2               ; strength reduced induction variable
        A       R7=R6,40            ; loop limit
while:
        ST      a(R6,100)=0         ; store 0 into a[i]
        L       R5=b(R6,140)        ; x gets a value from b[i]
        CMPI    R5,0
        BEQ     endwhile            ; exit loop if x == 0
        CMPI    R5,1
        BNEQ    else
        ST      c(R6,180)=1         ; store 1 into c[i] if x ==1
        B       endif
else:
        ST      c(R6,180)=2         ; store 2 into c[i] if x !=1
endif:
        ADD     R6=R6,4             ; post increment induction variable
        CMP     R6,R7
        BLT     while
endwhile:                           FIG. 12
```

```
        A       R8=R2,136           ; strength reduced induction variable
        A       R9=R8,40            ; loop limit
while:
        ST      a(R8,-36)=0         ; store 0 into a[i]
        LU      R5=b(R8,4)          ; x gets a value from b[i]
        CMPI    R5,0
        BEQ     endwhile            ; exit loop if x == 0
        CMPI    R5,1
        BNEQ    else
        ST      c(R8,40)=1          ; store 1 into c[i] if x ==1
        B       endif
else:
        ST      c(R6,40)=2          ; store 2 into c[i] if x !=1
endif:
        CMP     R8,R9
        BLT     while
endwhile:                           FIG. 14
```

METHOD FOR IMPROVING THE EFFICIENCY OF ARITHMETIC CODE GENERATION IN AN OPTIMIZING COMPILER USING MACHINE INDEPENDENT UPDATE INSTRUCTION GENERATION

FIELD OF THE INVENTION

The present invention relates to the optimization phase of a compiler and more particularly to permitting the compiler to make better use of the computer's instruction architecture, specifically those instructions which have autoindexing capability.

DEFINITION OF TERMS

To facilitate the description of the present invention, the following terms which are used throughout the specification and claims will be defined for convenience. Many of the terms are well understood in the field of optimizing compilers while others have specific application to the herein disclosed invention.

- memory referencing instructions: instructions which reference the main memory of a computer, such as those which load data from memory into the registers of the processor or which store data into memory from the registers.
- updated instructions: memory referencing instructions which have as a secondary, or side effect, the property of modifying one or more of the inputs of at least one addressing expression in a predictable way. Update instructions have also been called autoindexing operations. pre- or post-increment or decrement addressing modes, and autoincrement or autodecrement addressing modes.
- basic block: a portion of program code which may be entered only at the beginning and exited only at the end.
- flow graph: a directed graph representation of the control structure of a program, which is composed of basic blocks connected by edges. The blocks represent the non-branching portions of a program, the edges represent the flow of control, or branches, between them.
- node: a basic block.
- subgraph: a subset of the nodes in a flow graph and all of the edges originating or terminating at those nodes.
- path: a sequence of nodes, possibly repeated, which can be generated by starting at some node of a graph, and following edges in the graph.
- strongly connected region: a subgraph having a path between any nodes in the subgraph that does not include any nodes outside the subgraph.
- single entry strongly connected region: a strongly connected region leaving only one node with predecessor nodes outside the strongly connected region. For ease of reference, these regions are identified as loops herein.
- header node: the single entry point of a single entry strongly connected region.
- preheader node: the single predecessor node of the header node of a single entry strongly connected region.
- articulation node: a node in a loop that occurs on all paths which start from the header.
- whirl set node: a node in a loop that occurs on all paths which start from the header and do not exit the loop.
- side node: any node within a loop that is not a whirl set node.
- back dominator: for a selected rode in a loop, any node which appears on all paths to that node which start from the header node.
- region constant: an object that is not computed in a single entry strongly connected region.
- RC: a Region Constant.
- induction variable: a variable which is defined within a single entry strongly connected region by linear relationships such as the following:

$$v = w + RC$$

$$v = w$$

where RC is the region constant and w is an induction variable. It is most common that w is the same as v.
- IV: an induction variable.

BACKGROUND OF THE INVENTION

A compiler maps a higher-order computer language into an assembly or machine language. The higher-order computer language must be translated into machine language before it can be executed.

A compiler supports the analysis-synthesis paradigm. The source language is first analyzed into its lexical, grammatical, and semantic components, and after the completion of a number of phases is finally synthesized into functionally equivalent constructs in the target language. When compiling code for a computer program, optimization techniques are used within the compiler to improve the quality of the generated code. The improved quality relates to either a direct saving in the size of the code needed for the program or an increase in the execution performance of the program.

A typical compiler structure is shown in FIG. 1 and illustrates six major phases. The higher-order source code is input to the compiler and the resulting output is assembly code. Each compiler phase may have additional minor subphases. For example, it is not unusual in an optimizing compiler to divide the many optimization strategies into separate modules. If we remove the optimizer phase from the typical compiler structure, as shown in FIG. 1, then the intermediate level text is transformed into assembly language in a straight forward manner. Here the assembly language would not be as efficient with respect to execution time or storage space.

Consider the C computer program fragment as shown in FIG. 2. This portion of a computer program stores a value of zero into successive memory locations pointed to by the pointer p. The straight forward assembly code is shown in FIG. 3 for it target machine of a Digital Equipment Corporation PDP-11 computer. The first instruction updates the memory location with a value of zero, and the second instruction adjusts the memory pointer to the next memory location. The optimized assembly code is shown in FIG. 4 for the same target machine. Here this single instruction moves the value of zero into memory and then updates the pointer to the next memory location, taking advantage of the autoindexing capability of the PDP-11 architecture. This is an addressing mode that references a memory location and then adjusts the register used as the memory pointer. Some instruction architectures provide pre- and post-increment or decrement forms of memory referencing instructions. These instructions have the characteristic of referencing memory and modifying the contents of an address register used in the memory address calculation. The address register side effect is to automatically add or subtract a specified or implied amount to or from the amount in the address register. This class of memory referencing operation may be considered either as special instructions or addressing modes. These operations have been called 'Update Instructions', autoindexing operations, and autoincrement or autodecrement addressing modes. The autoincrement and autodecrement addressing modes provide automatic stepping of an index register value through a sequence of addresses and offer a significant increase in performance.

Some optimization strategies depend on a particular target machine or architectural feature such as autoindexing. The Digital Equipment Corp. VAX-11 and Motorola MC68000 have architectures with some form of autoindexing.

Other optimization strategies are designed specifically independent of the target architecture. An example is moving some computations from inside the bounds of a loop to the outside of the loop.

Source language features may also be designed to improve the quality of code, especially in the absence of optimization. For example, the use of pointers and the increment and decrement operators in the C language provide an alternative to using indexed arrays and indicate opportunities for autoindexing.

PRIOR ART

The idea of generating update instructions is known. The book entitled "Crafting a Compiler" by C. N. Fischer and R. J. LeBlanc Jr. discusses 'autoincrement' and 'autodecrement' addressing modes on page 554 but indicates that they are often difficult to exploit in generated code unless they are directly represented in the source language as is the case with the C language. The text does not specify a technique for update instruction generation except for suggesting a forward search within a basic block, starting from a memory referencing instruction and looking for an addition to an index variable. In certain cases the addition could be removed and the memory referencing instruction changed to an autoindexing operation.

The publication "Engineering a Compiler. VAX-11 Code Generation and Optimization" by P. Anklam, D. Cutler, R. Heinen, Jr. and M. D. MacLean describes, on page 130, an algorithm for update instruction generation. However, it is only adequate to handle the most simple cases. For example, it limits the loop increment (the amount added to the induction variable) to 1 or −1. The algorithm also restricts the search for a memory referencing instruction to convert to an update form to certain basic blocks in a loop.

The technique known as 'Reassociation' combines a number of transformations to make the computations of certain sums or sum of products more efficient. Many of these computations arise in addressing quantities in storage. A particularly advantageous technique for Reassociation is described in U.S. Pat. No. 4,802,091, issued Jan. 31, 1989 to Peter Markstein et al and assigned to IBM Corporation.

Reassociation attempts to exploit common subexpressions in addressing computations, to perform strength reduction of induction variables, and to convert memory referencing instructions to addressing modes available on the target machine. Using Reassociation, the issues of rearranging and simplifying computations can be addressed from an abstract viewpoint which will remain valid when a compiler is modified to translate another language or produce code for another target machine.

Update instruction generation, as described in this disclosure, has been implemented as an extension to Reassociation. Many of the necessary preconditions specified for generating updates are functions performed by Reassociation, such as identifying induction variables, finding memory referencing instructions which use induction variables, and performing strength reduction.

However, update instruction generation is not dependent on the use of the Reassociation technique. Update instruction generation is only dependent on utilizing some technique to gather the necessary data and perform the transformations required to implement the process described herein.

SUMMARY OF THE INVENTION

The present invention provides an improvement in methods for compiling computer programs. The method includes the steps of writing the computer program in a source code and operating on the intermediate language and using a compiler to generate a program in object code for execution by a suitable processor. The compiler is designed to enable the compiled program to perform any of the autoindexing instructions. The compiler is provided with information as to which of four autoindexing forms can be performed by the suitable processor and compiles the source code program so that the object code has only those autoindexing instructions that can be executed by the suitable processor. The compiling includes the improvement of converting an autoindexing instruction unacceptable to the processor which would normally be generated by the compiler if the compiler were unrestricted in performing the compiling operation to an autoindexing instruction acceptable to the processor.

The compiler improves the performance of loops within a program. More specifically, the compiler includes means for finding memory referencing instructions within each selected loop which use an induction variable, means for identifying an instruction sequence within a selected loop which adds or subtracts a value from an induction variable within the selected loop, means for selecting at least one instruction within the loop for conversion to an update instruction, means for modifying the memory referencing instructions so as to form the update instruction, and means for applying offset compensation within the loop to compensate for the effects of producing the update instruction.

The invention further provides an improved method of compiling a computer program so as to improve the performance of loops within the program. The method includes the sequence of steps of finding all instructions within each selected loop which references memory using an induction variable, identifying an instruction sequence within the selected loop that modifies the value of an induction variable that the memory referencing instructions use, selecting at least one instruction within the loop for conversion to an update instruction, modifying the at least one selected instruction to form the update instruction, and applying an offset compensation within the loop to compensate for the effects of producing the update instruction. When used in conjunction with other optimization processes, this invention will eliminate certain addition or subtraction operations in loops which deal with arrays of objects in memory. This often occurs after the optimization known as 'Induction Variable Strength Reduction' has replaced the multiplications in addressing computations with additions or subtractions. High level languages such as Fortran, C, PL/I, ADA etc. generally provide many opportunities for such code improvement.

The invention further provides a method for optimizing computer code by selecting memory referencing instructions potentially suitable for transformation to update instructions and transforming those instructions, found suitable, into update instructions. All memory referencing instructions in a loop which use a particular induction variable are examined and all memory referencing instructions not reached on any traversal of the loop reaching an induction variable definition point or reached on any traversal of the loop which does not reach the induction variable definition point and does not exit the loop are rejected as unsuitable for transformation. At least one of the remaining unrejected memory referencing instructions is selected as a candidate for transformation to an update instructions. When the candidate is selected, offset compensation is attempted on the memory referencing instructions as required to compensate for the transformation. If successful, the candidate instruction is transformed into an update instruction. If unsuccessful, the candidate instructions is rejected. The selecting and rejecting process is repeated until either at least one memory referencing instruction suitable for transformation has been found or all memory referencing instructions have been rejected.

In a preferred embodiment, the remaining unrejected memory referencing instruction first selected is the instruction most closely adjacent to the induction variable definition point and, if unsuccessful, the next most closely adjacent memory referencing instruction is then selected as a candidate.

The update instruction generation technique of the present invention does not have the limitation that the autoindexing be present in the source program. It also allows the generation of autoindexing operations that are in a different basic block from the addition or subtraction to an index (induction) variable.

Further, the update instruction generation process described herein does not have the limitations of Anklam et al. The present technique is able to analyze extremely complex sections of code and use the update instruction generation technique to optimize code that was previously considered optimal.

SUMMARY OF DRAWINGS

This invention is described with reference to the drawings in which:

FIG. 2 shows an example C computer program.
FIG. 3 shows an example of straight forward assembly code.
FIG. 4 shows an example of optimized assembly code.
FIG. 9 shows an example #1 in source code.
FIG. 10 shows an example #1 memory map.
FIG. 11 shows example #1 in intermediate code before preliminary processing.
FIG. 12 shows example #1 in intermediate code after preliminary processing.
FIG. 14, on the sheet of drawings bearing
FIG. 7, shows example #1 in optimized code.

DETAILED DESCRIPTION

This invention provides a process in the optimization phase of an optimizing compiler to transform memory referencing instructions into update instructions which have the side effect of modifying an addressing register. These transformations are designed to reduce the number of instructions inside loops by using autoindexing operations to eliminate instructions which explicitly modify an induction variable.

This invention will utilize all four forms of autoindexing, namely pre-increment, post-increment, pre-decrement and post-decrement. Since most computer instruction architectures support only a subset of the four forms, the invention will apply a conversion between pre- and post- forms, as necessary. Most architectures will also restrict the sign or magnitude of the side effect, and only allow autoindexing in specific addressing modes. The invention provides for such restrictions and ensures that they are satisfied.

Update instruction generation determines each case where autoindexing instructions can be applied, selects where the updates are to be applied, and adjusts the memory referencing instructions that use the induction variable to which an update was applied.

Figure 1:
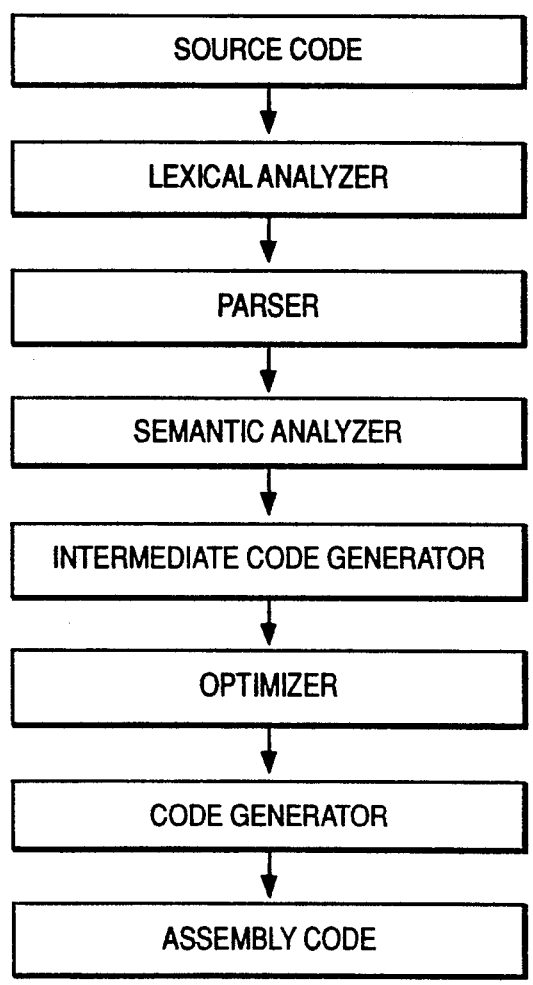
FIG. 1 illustrates a typical compiler structure.
Figure 5:
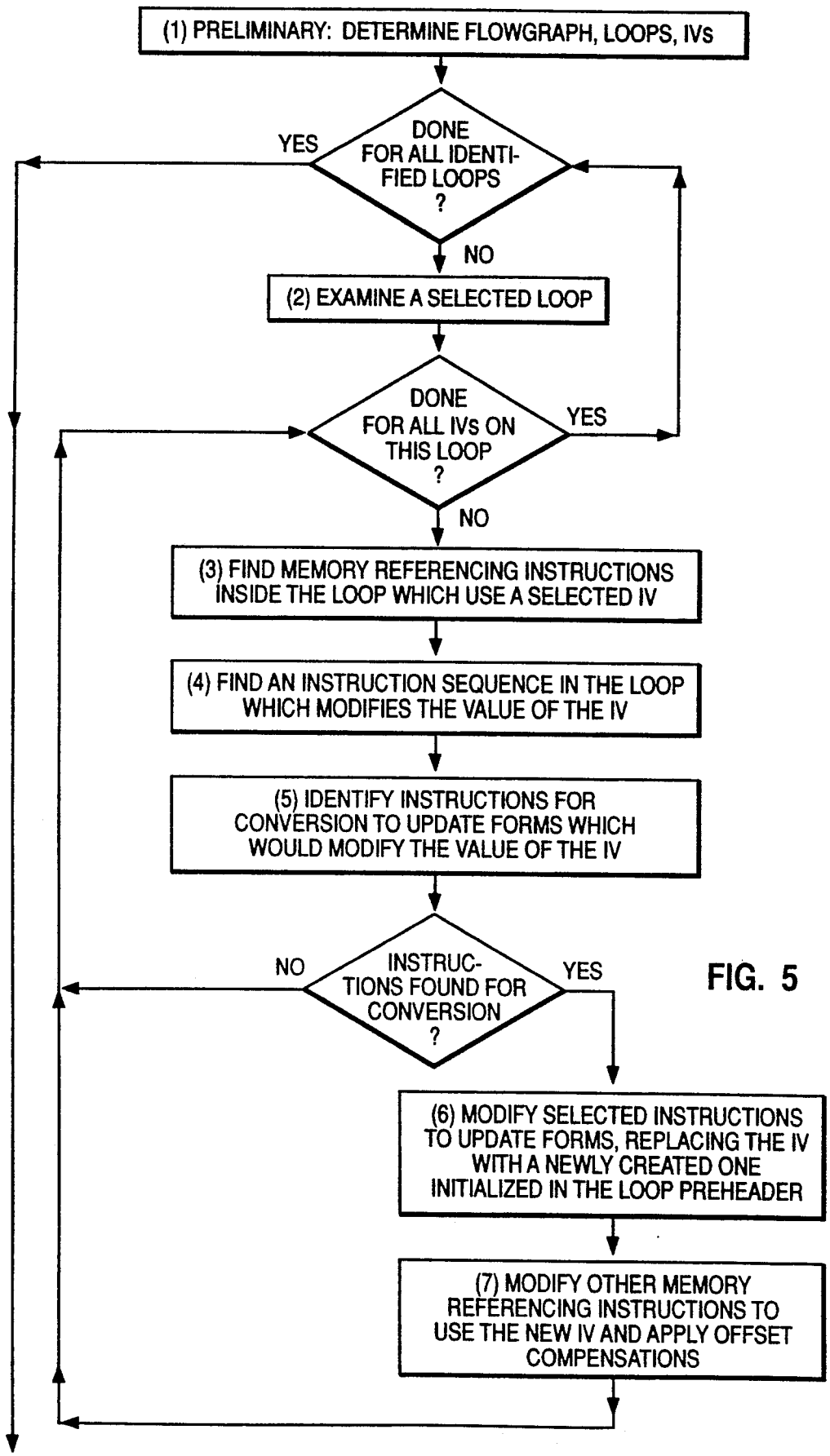
FIG. 5 illustrates a process for Update Instruction generation in accordance with the invention.

The preferred process of update instruction generation, is illustrated schematically in FIG. 5. The process is achieved by executing the following steps:

1. The flow graph of the computer program is determined and all loops are identified. Within each loop, the nodes are classified as articulation, whirl set and side nodes. Back dominator relationships are determined for all nodes within the loop. The induction variables for each loop are then identified and strength reduction is applied, if applicable. All memory referencing instructions are modified to conform to the addressing mode restrictions of the target instruction architecture. It is desirable that the addresses be formed by summing a register and an integer displacement. It is preferred that update instruction generation be performed on addresses formed in this manner.

2. Examine a selected loop.

3. All the memory referencing instructions inside a selected loop which use a particular induction variable for addressing are located. It is preferable that the selected induction variable be one which is only modified at one point in the loop. This permits a simpler method which requires less computation. However, this is not intended to be limiting on the invention. The update instruction process can be readily extended to handle cases where the induction variable is modified at a number of points provided one wishes to deal with the increased complexity of the computations.

4. An instruction or sequence of instructions in the selected loop which adds or subtracts a value from the induction variable is found. This value should be one that could be used in an autoindexing operation on the target architecture. For example, the restrictions on some target architectures may only allow particular constant values. The instructions so found will be identified as the 'induction variable definition point'. The amount by which the induction variable is changed is the 'update amount'. A positive amount is an increment and a negative amount a decrement.

5. Any memory referencing instructions to be converted to update instructions are identified.

6. Each memory referencing instruction identified for conversion to an update operation is modified into an update operation. In each update operation the original induction variable is replaced by a newly created induction variable. An instruction is inserted in the loop preheader that assigns the value of the original induction variable to the newly created induction variable.

7. Modify each of the remaining memory referencing instructions to use the newly created induction variable in place of the original induction variable and apply an offset compensation to these remaining memory referencing instructions which appear in an area where the value of the newly created induction variable differs from the value of the original induction variable.

8. The process is repeated for each induction variable in the selected loop.

9. The process is repeated for each loop in the entire computer program.

Figure 6:
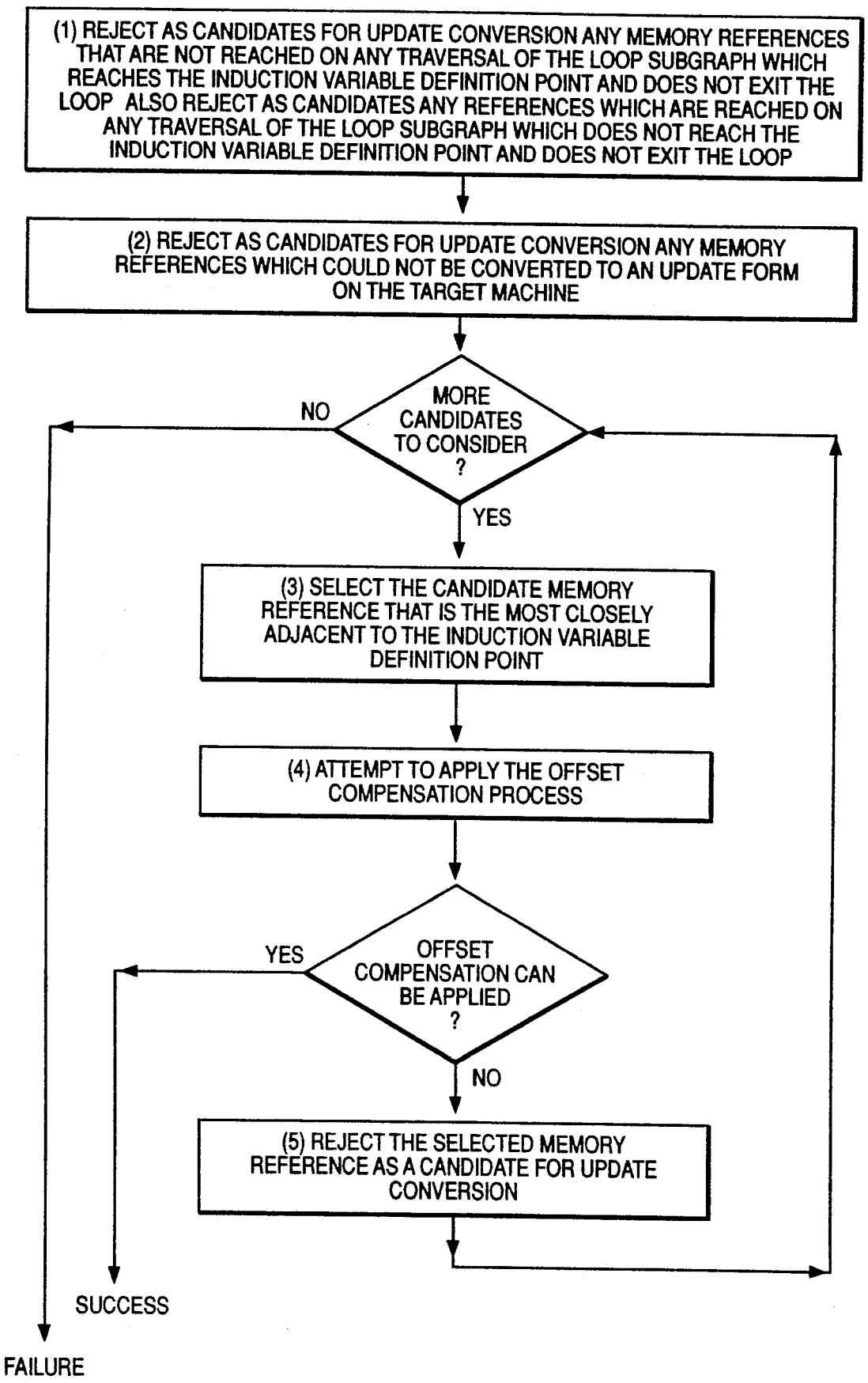
FIG. 6 shows an expanded step from FIG. 5.

FIG. 6 outlines details of the process used to select the memory referencing instructions which are to be converted to an update form as shown broadly at Step 5 in FIG. 5. The steps in this process are as follows:

1. All of the memory referencing instructions in a loop which use a particular induction variable for addressing are examined. Any memory referencing instruction not reached on any traversal of the subgraph of the loop which reaches the induction variable definition point and does not exit the loop is rejected as a candidate for conversion to an update form. Any memory referencing instruction reached on any traversal of the subgraph which does not reach the induction variable definition point and does not exit the loop is rejected as a candidate for conversion. These constraints ensure that, on any traversal of the subgraph which does not exit the loop, any suitable candidate must be reached if and only if the induction variable definition point is reached.

Loop exits are ignored because it does not matter if there is a path through the subgraph on which only one of the update point or induction variable definition point is reached and then the loop exit is taken. Although this causes the value of the new induction variable introduced when updates are created to differ from the value of the original induction variable after the loop is exited, the new induction variable is never used after the exit.

In the preferred embodiment, this rejection process proceeds as follows. If the induction variable update point is in a side node, any memory referencing instructions which are not in that side node are rejected. If the induction variable definition point is in a whirl set node, any memory referencing instructions which are not in whirl set nodes are rejected.

A less restrictive process for choosing candidates is possible. Candidates could include any group of memory referencing instructions such that on any traversal of the subgraph which reaches the induction variable definition point and does not exit the loop, one and only one memory referencing instruction in the group is reached. This would allow a group to be chosen and all members of the group converted to an update form. Example 1, in FIG. 9, illustrates a case where this extension would allow more freedom in the choice of update points and will be discussed hereinafter.

2. Reject from the list of candidates found in the previous step any memory referencing instructions which cannot be converted to an appropriate update form on the target machine. This process is inherently machine dependent since different architectures support different forms of autoindexing. One common restriction, found in the PDP-11, VAX-11 and MC68000 architectures, is to support only update amounts which correspond to the size of the object referenced in memory. The target hardware may also restrict the addressing modes which may be converted to an update form. This will be affected by the preliminary processing done by the first step of the update instruction generation process. An early recognition of the desire to use autoindexing could motivate the preliminary processing to ensure that memory referencing instructions are resolved to appropriate addressing modes or otherwise rendered suitable for updates. For the target machines considered herein, preliminary processing is used to reduce the addressing mode of possible candidate instructions to a single register and an integer displacement. This is the addressing mode expected by the processes which create update instructions and perform offset compensations.

3. Select the candidate memory referencing instruction that is 'most closely adjacent' to the induction variable definition point. There are three possible cases:

a. If the induction variable definition point is in a side node, the candidate memory referencing instruction that most immediately precedes or follows the definition point in that basic block is selected. This can be found by a simple scan of the instructions in the basic block.

b. If the induction variable definition point is in a whirl set node, and there are candidate memory referencing instructions in that whirl set node, the candidate memory referencing instruction that most immediately precedes or follows the definition point in that basic block is selected.

c. If there are no candidates in the whirl set node which contains the definition point, then a candidate in the whirl set node that contains a candidate and that most immediately precedes or follows the definition point on a traversal of the loop subgraph which does not exit the loop is selected. This is found using the back dominator information as follows. For all whirl set nodes containing candidates which precede the definition point (these blocks are identified by the fact that they all back dominate the definition point block), the block which is dominated by all others is selected. For all whirl set nodes containing candidates which follow the definition point (these blocks are identified by the fact that they are all dominated by the definition point block), the block which dominates all others is selected. If a block is found in both cases, either block may be selected. Within the chosen block, the candidate memory referencing instruction that most immediately precedes or follows the definition point, as appropriate, depending on whether the block precedes or follows the definition point, is selected.

This process may be further improved. Although the above method arbitrarily selects either a candidate which precedes or follows the induction variable definition point, this choice should be motivated by the characteristics of the target machine. For machines with a pre-update of the necessary type (pre-increment for positive update amounts, pre-decrement for negative amounts), it is better to select a candidate following the definition point. For machines with a post-update of the necessary type, it is better to select a candidate preceding the definition point. This reduces the number of cases where the conversion between pre- and post-forms must be applied.

4. Attempt to apply the offset compensation process shown in FIG. 8 but do not actually modify any of the memory referencing instructions.

5. If the offset compensation can not be successfully applied, reject the selected memory referencing instruction as a candidate and repeat the selection and testing of the most closely adjacent candidate.

Figure 7:
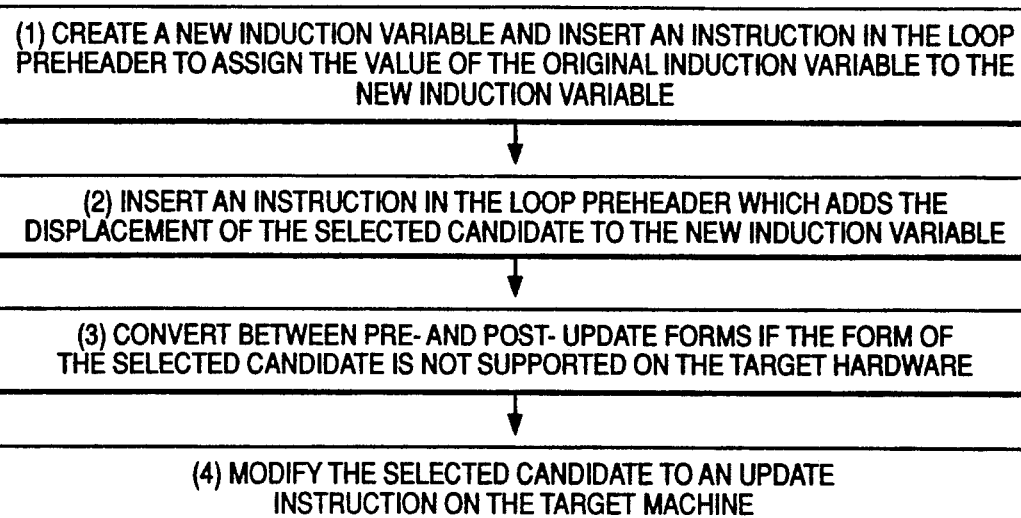
FIG. 7 shows an expanded step from FIG. 5.

FIG. 7 outlines the process used to convert the selected candidate memory referencing instruction to an update instruction form as shown broadly at Step 6 in FIG. 5. The steps in this process are as follows:

1. Create a new induction variable and insert an instruction in the loop preheader that assigns the value of the original induction variable to the new induction variable.

2. Insert an instruction in the loop preheader which adds the displacement of the selected candidate to the new induction variable. In the preliminary processing, the addressing mode of possible candidate instructions was reduced to one register (which must be the original induction variable) and an integer displacement. Adding the induction variable and displacement has the effect of reducing the addressing mode of the selected candidate to a single register (the new induction variable).

3. Convert between pre- and post- update forms if the form of the selected candidate memory referencing instruction is not supported on the target hardware.

The form of update instruction needed, pre- or post-, is determined by the relative position of the selected candidate memory referencing instruction and the induction variable definition point. If the candidate precedes the definition point on a traversal of the subgraph, a post-update is needed. If the candidate follows the definition point, a preupdate is needed. If the target hardware does not support the necessary form, a conversion process is applied as follows:
   a. Conversion of post-increment to pre-increment or pre-decrement to post-decrement. Insert an instruction in the preheader of the loop which subtracts the update amount from the new induction variable.
   b. Conversion of post-decrement to pre-decrement or pre-increment to post-increment. Insert an instruction in the preheader of the loop which adds the update amount to the new induction variable.

4. Modify the selected candidate memory referencing instruction to an update instruction on the target machine.

On most architectures which support update forms, including the PDP-11, VAX-11 and MC68000, a register indirect addressing node must be used. For these architectures the update amount is implicitly equal to the size of the memory object referenced. For this type of target machine, the memory referencing instruction is simply rewritten using the new induction variable in a register indirect addressing mode update form.

Figure 8:
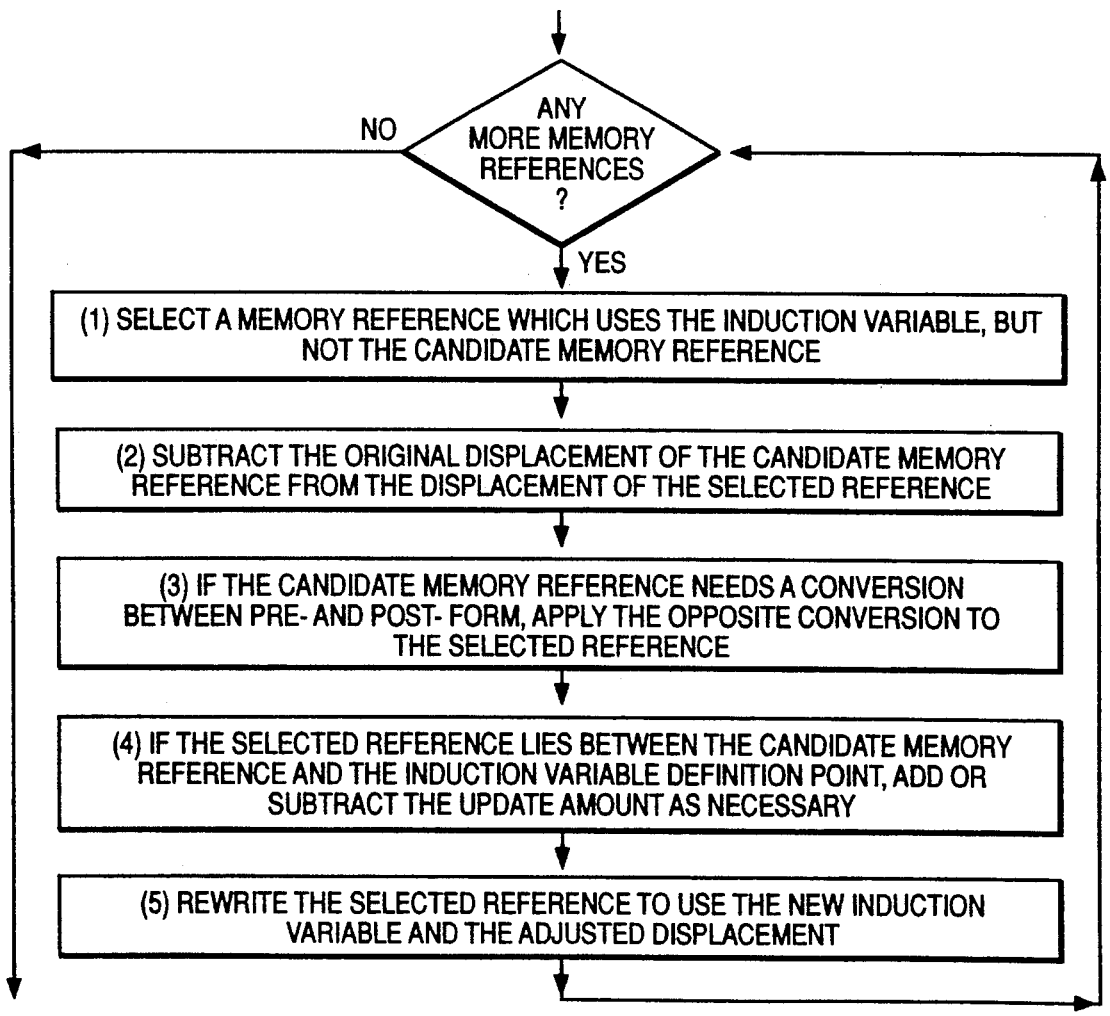
FIG. 8 shows an expanded step from FIG. 5.

FIG. 8 outlines the process for modifying other memory referencing instructions once a candidate memory referencing instruction has been chosen for conversion to an update instruction form, as shown broadly at Step 7 in FIG. 5. The steps in this process are as follows:

1. Select an arbitrary memory referencing instruction, other than the candidate chosen for conversion to an update form, which uses the induction variable under consideration.

2. Subtract the original displacement of the candidate memory referencing instruction from the displacement of the selected referencing instruction.

3. If the candidate memory referencing instruction requires a conversion between pre- and post-update forms, apply the opposite conversion to this memory referencing instruction based on the type of candidate conversion as follows:
   a. Conversion of post-increment to pre-increment or pre-decrement to post-decrement. Add the update amount to the displacement of this memory referencing instruction.
   b. Conversion of post-decrement to pre-decrement or pre-increment to post-increment. Subtract the update amount from the displacement of this memory referencing instruction.

4. If the current memory referencing instruction lies between the candidate memory referencing instruction and the induction variable definition point on some traversal of the subgraph, add or subtract the update amount to or from the displacement of the current memory referencing instruction, as necessary.

First, determine if the current memory referencing instruction lies between the candidate and the definition point. There are four possible cases:
   a. If the current memory referencing instruction and the candidate memory referencing instruction are in the same node, then perform a scan of the instructions in the basic block to find their relative positions. Together with the knowledge of the relative position of the candidate and definition point, this will determine if the current memory referencing instruction falls between them.
   b. If the current memory referencing instruction and the induction variable definition point are in the same node, then perform a scan of the instructions in the basic block to find their relative positions. Together with the knowledge of the relative position of the candidate and definition point, this will determine if the current memory referencing instruction falls between them.
   c. If the induction variable definition point is in a whirl set node that dominates the node containing the candidate memory referencing instruction, then any nodes dominated by the definition point node but not by the candidate node must be between the two.
   d. If the candidate memory referencing instruction is in a whirl set node that dominates the node containing the induction variable definition point, then any nodes dominated by the candidate node but not by the definition point node must be between the two.

If the current memory referencing instruction lies after the candidate memory referencing instruction but before the induction variable definition point, subtract the update amount from the displacement of the current memory referencing instruction. If the current memory referencing instruction lies after the definition point but before the candidate memory referencing instruction, add the update amount to the displacement of the current memory referencing instruction.

5. Rewrite the current memory referencing instruction, replacing the original induction variable with the new induction variable created when the candidate memory referencing instruction was modified to an update form, and using the new displacement value calculated.

The new displacement value must be in the range allowed by the register-displacement addressing mode on the target machine. If it is not, the offset compensation cannot be properly applied for this candidate memory referencing instruction. This would mean that a new candidate would have to be selected as indicated hereinbefore.

This update instruction generation process, as specified, is sufficient for the form of the update instructions found on most architectures. It takes into account various restrictions on addressing modes, displacement ranges and update amounts found on particular target machines However, some architectures may have less restrictive forms of update instruction. In such cases, it may be desirable to extend the update instruction generation process to support those architectures, usually in order to generate update forms in unique situations.

One example of an extension added to the preferred embodiment is the following. A particular target architecture allows either register-displacement or register-register addressing modes in update instructions, and the update amount is explicitly given by the displacement or second register. Effective addresses are formed by adding the register and displacement, or the two registers. The side effect of an update form instruction is to store the effective address back into the first register. A pre-increment or pre-decrement form of autoindexing is implemented, depending on the value of the displacement or second register.

The extension allows update amounts which are not known at compile time by using the register-register addressing mode form of update. This in turn necessitates extensions to the process of identifying instructions for conversion to update forms, and to the process of applying offset compensations. The extensions restrict the cases where update instructions are generated when the update amount is not known at compile time as follows.

First, the process of identifying instructions for conversion to update forms has a preliminary step added before step 1 in FIG. 6. That is if the update amount is not a value known at compile time, a failure indication is returned unless all memory referencing instructions using a particular induction variable have the same displacement. Also, if the type of update is a decrement (that is, a value subtracted from the induction variable), it is converted to an increment by inserting instructions in the loop preheader which assign the update amount to a new register, and then negate the new register.

Next, the process of applying offset compensations is modified because compile time displacement modifications can not always be applied. Step 2 of the process of applying offset compensation as shown in FIG. 8 now always results in a displacement of zero if the update amount is not known at compile time. Step 3 in FIG. 8 is modified to add the update amount, if necessary, by using a register-register addressing mode (note that the only possible conversion needed is post-increment to pre-increment). Step 4 in FIG. 8 is modified to change the register-displacement addressing mode to register-register if the update amount must be added, or to change the register-register addressing mode back to register-displacement if the update amount must be subtracted. Note that the only case where the update amount must be added is in cases where the induction variable definition point precedes the update point chosen. In this case no change is necessary at step 3 (that is, there are no cases where the update amount must be added twice). Similarly, the only case where the update amount must be subtracted is when the update point precedes the induction variable definition point, and the post-increment to pre-increment conversion is applied in step 3 (that is, the update amount must be subtracted in step 4 only when it was added in step 3).

Example 1 in FIG. 9 shows a fragment from a C program. The process of update instruction generation will be illustrated for this example, targeting the machine described above.

A memory map of the data for this example is shown in FIG. 10. Arrays a, b and c are allocated in contiguous blocks in an area referenced by register R2. Array a starts at offset 100, array b at offset 140 and array c at offset 180 from R2. All array elements are four bytes in size.

One form of intermediate code for this computer program fragment is shown in FIG. 11. At this point the preliminary processing required to apply the update instruction generation process has not yet been done. Register R3 in this code is used for induction variable i, and register R5 is used for variable x.

FIG. 12 shows the code after preliminary processing. A number of standard, well known optimizations have been applied at this point. All memory referencing instructions have been reduced to register-displacement addressing modes, and strength reduction and linear test replacement have been applied. Together these steps resulted in the creation of the induction variable in register R6. In the loop preheader R6 is initialized to the sum of R2 and i*4, compile time arithmetic reducing this to just R2. Where the variable i had been incremented by one. R6 is now incremented by 4. Linear test replacement has changed the loop termination check to use the new induction variable R6, and initialized R7 in the loop preheader to contain the proper comparison value.

Figure 13:
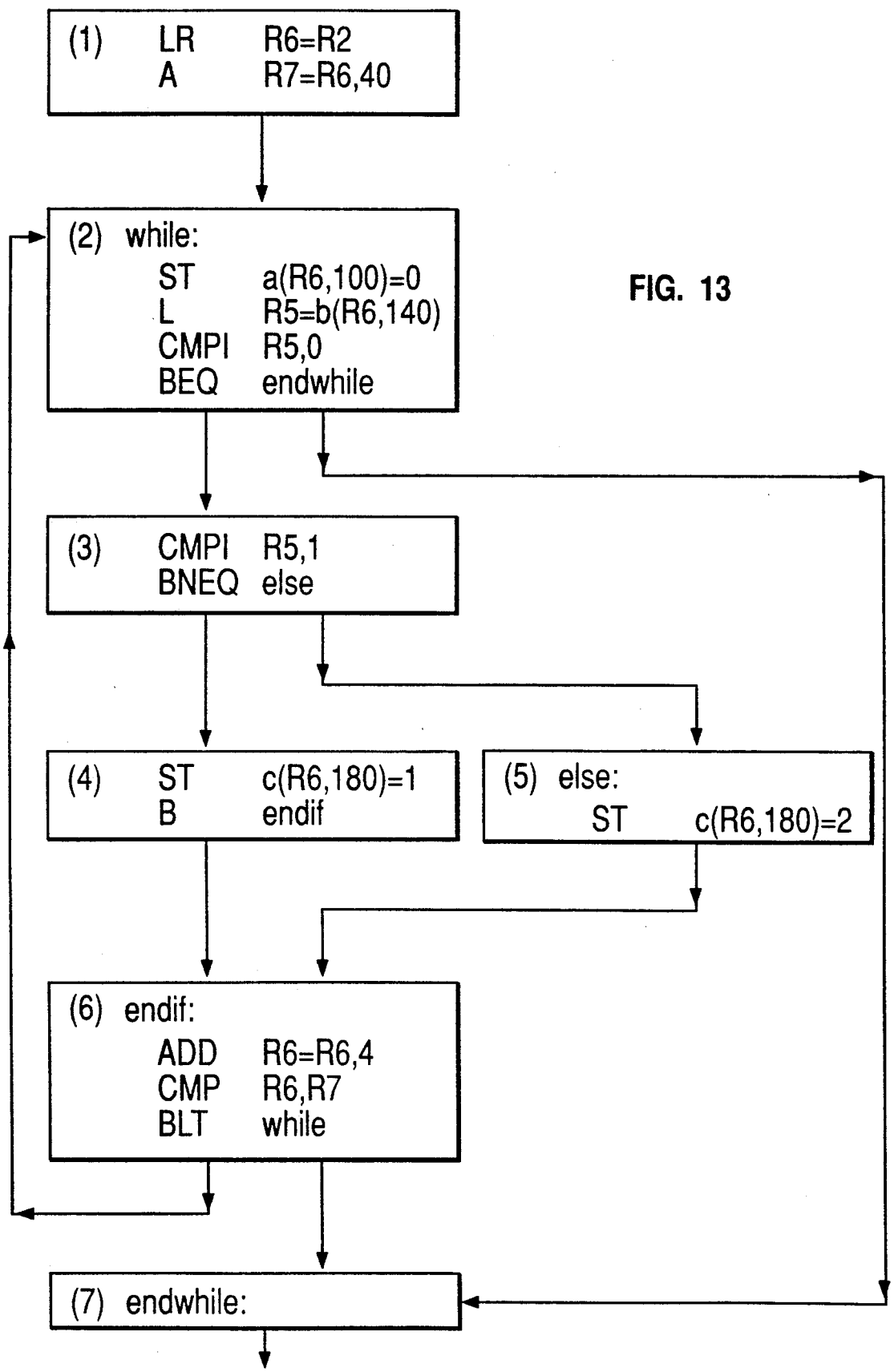
FIG. 13 shows example #1 as a subgraph.

FIG. 13 shows the same code as FIG. 12, but in the form of a subgraph. Node 1 is the loop preheader basic block and node 2 is the loop header. Node 2 is the only articulation node in the loop, while nodes 2, 3 and 6 are whirl set nodes. Nodes 4 and 5 are side nodes.

The final optimized code is shown in FIG. 14. The process of update instruction generation has functioned as follows. First, the memory referencing instructions using the only induction variable in the loop (R6) were identified: a store to array a in node 2, a load from array b in node 2, and a store to array c in each of nodes 4 and 5. The ADD instruction in node 6 is identified as the induction variable definition point, with update amount 4.

In choosing the update point, the stores to array c are rejected because they are in side nodes and the induction variable definition point is in a whirl set node. This is a case where the proposed extension to that process could be used. It is possible to choose both of the store instructions in nodes 4 and 5 for conversion to an update form. Instead, the load from array b is tentatively chosen and the offset compensation process is attempted. When this process succeeds the load is converted to an update form.

The update conversion process creates the new induction variable R8 and assigns it the value of R6 in the loop preheader. The original displacement of b, 140, is then added to R8. Next, because the target hardware only supports lore-update forms, the post-increment is converted to a pre-increment by subtracting the update amount (4) from R8. Again, compile time evaluation has reduced this to adding R2 and 136 and assigning that value to R8.

All other memory referencing instructions are then modified as necessary. The displacement of the store to array a has 140 subtracted from it, and then 4 added, resulting in a value of −36. Both of the stores to array c are found to be between the chosen update point and the induction variable definition point and so, in addition to the changes applied to the store to a, 4 is subtracted from the displacement, resulting in a value of 40.

After the update instruction generation process, linear test replacement has been used to remove the remaining use of R6 by modifying the loop termination test to be based on the new induction variable R8.

The embodiments of the invention in which an exclusive property or privilege is claimed are defined as follows:

1. An improved method for operating a data processing system to compile a computer program written in a source code, by operating on said source code program using a compiler to generate a program in object code for performance by a suitable processor, said compiler being designed to enable said compiled program to perform any of an automatic pre-increment, automatic post-increment, automatic pre-decrement or automatic post-decrement instructions, comprising the steps performed by said process system of:
   providing said compiler with information as to which of said increment and decrement instructions can be performed by said suitable processor; and
   compiling said source code program, said compiling further comprising the step of converting an automatic increment or decrement instruction unacceptable to said processor to automatic increment or decrement instructions acceptable to said processor.

2. An improved method for operating a data processing system to compile a computer program written in a source code, by operating on said source code program using a compiler to generate a program in object code for performance by a suitable processor, said compiler being designed to enable said compiled program to perform autoindexing instructions, comprising the steps performed by said processing system of:
   providing said compiler with information as to which autoindexing instructions can be performed by said suitable processor; and
   compiling said source code program, said compiling further comprising the step of converting autoindexing instructions unacceptable to said processor to autoindexing instructions acceptable to said processor.

3. An improved system for compiling a computer program to improve the performance of loops within said program, said system including:
   means for finding memory referencing instructions within each loop;
   means for identifying an instruction sequence within a selected loop which adds or subtracts a value from an induction variable in said selected loop;
   means for selecting memory referencing instructions within said loop for conversion to an update instruction;
   means for modifying said memory referencing instructions so as to form said selected updated instructions;
   means for modifying other memory referencing instructions in said selected loop to compensate for modifying said memory referencing instructions to form said update instructions.

4. An improved system as defined in claim 3 wherein said means for selecting an instruction for conversion includes means for selecting each memory referencing instruction using an induction variable.

5. An improved system as defined in claim 3 wherein said means for modifying said memory referencing instruction includes means to compute changes to displacement or index for said instruction so as to make an address of said instruction unchanged and means to add an instruction to a preheader for said loop in accordance with said computed change.

6. An improved system as defined in claim 4 wherein said means for modifying said memory referencing instruction includes means to compute changes to displacement or index for said instruction so as to make an address of said instruction unchanged and means to add an instruction to a preheader for said loop in accordance with said computed change.

7. An improved system as defined in claim 3, claim 4, claim 5 or claim 6 wherein said means for applying offset compensation includes means for selecting each memory referencing instruction that uses said induction variable other that said instruction selected to be the update instruction, means for determining if the formation of said update instruction has changed said induction variable at each memory referencing instruction and means for modifying each instruction having a changed induction variable to compensate for said change.

8. An improved method for operating a data processing system to compile a computer program so as to improve the performance of loops within said program comprising a sequence of steps performed by said data processing system including:
   finding all instructions within each selected loop that references a memory location;
   identifying an instruction sequence within said selected loop that modifies a value of an induction variable for said loop;
   selecting an instruction within said loop for conversion to an update instruction;
   modifying said selected instruction to form said update instruction; and
   applying an offset compensation to said loop to compensate for said instruction sequence address updates.

9. A method as defined in claim 8 wherein said step of selecting an instruction to be an update instruction includes the steps of selecting each memory referencing instruction using an induction variable and selecting a single one of said instructions for update instruction generation.

10. A method as defined in claim 8 wherein said step of modifying said memory referencing instructions includes the steps of computing changes to displacement or index for each said instruction to keep each instruction address reference unchanged and adding an instruction to a preheader to said loop in accordance with said computed change.

11. A method as defined in claim 9 wherein said step of modifying said memory referencing instructions includes the steps of computing changes to displacement or index for each said instruction to keep each instruction address reference unchanged and adding an instruction to a preheader to said loop in accordance with said computed change.

12. A method as defined in claim 8, claim 9, claim 10 or claim 11 wherein said step of applying offset compensation includes selecting each memory referencing instruction using said induction variable except said instruction selected for update instruction generation, determining if said update instruction generation has modified said induction variable at each memory referencing instruction and modifying each instruction to compensate for said modification of said induction variable.

13. A method for operating a data processing system to optimize computer code by selecting memory referencing instructions potentially suitable for transformation to update instructions and transforming those instructions, found suitable, to update instructions comprising the steps performed by said data processing system of:
 examining all memory referencing instructions in a loop which use a particular induction variable;
 rejecting all memory referencing instructions not reached on any traversal of said loop reaching an induction variable definition point or reached on any traversal of said loop which does not reach said induction variable definition point and does not exit said loop, from the remaining memory referencing instructions not rejected;
 selecting the memory referencing instruction most closely adjacent to said induction variable definition point as a candidate for transformation to an update instruction;
 attempting offset compensation on said memory referencing instructions as required to compensate for said transformation of said selected candidate instruction and, if successful, transforming said candidate instruction into an update instruction, and, if unsuccessful, rejecting said candidate instruction and selecting the next most closely adjacent memory referencing instruction as a candidate; and
 repeating said selecting and rejecting process until either at least one memory referencing instruction suitable for transformation has been found or all memory referencing instructions have been rejected.

14. The invention as defined in claim 13 including the further step of rejecting all memory referencing instructions outside a side node where said induction variable update point is in said side node.

15. The invention as defined in claim 13 including the further step of rejecting all memory referencing instructions outside a whirl set node where said induction variable update point is in a whirl set node.

16. The invention as defined in claim 13 including the step of rejecting all memory referencing instructions as candidates which cannot convert to an update instruction form acceptable to a preselected target machine.

17. The invention as defined in claim 13 wherein, if said induction variable definition point is in a whirl set node and a candidate memory referencing instruction is not found in said whirl set node, a most closely adjacent candidate is selected from a whirl set node which most immediately precedes or follows said definition point on a traversal of said loop that does not exit said loop.

18. The invention as defined in claim 13 wherein when a suitable candidate memory referencing instruction is found, said instruction is transformed into an update instruction and further including the steps of:
 creating a new induction variable and inserting an instruction in a preheader to said loop that assigns the value of said original induction variable to said new induction variable;
 inserting an instruction in said preheader which adds an amount equal to the displacement of said selected candidate to said new induction variable; and
 transforming said selected candidate memory referencing instruction into an update instruction on a selected target machine.

19. The invention as defined in claim 18 further including the step of converting said update instruction to a form supported by said selected target machine as required.

20. The invention as defined in claim 19 wherein said step of converting comprises selecting one of the following alternative steps:
 inserting an instruction in said preheader of said loop to subtract an update amount from said new induction variable so as to convert a post-increment instruction to a pre-increment instruction or a pre-decrement instruction to a post-decrement instruction; or
 inserting an instruction in said preheader of said loop to add an update amount from said new induction variable so as to convert a post-decrement instruction to a pre-decrement instruction or a pre-increment instruction to a post-increment instruction.

21. The invention as defined in any one of claims 13, 14 or 15 further including the step of modifying all memory referencing instructions in said loop when a memory referencing instruction has been selected for transformation to an update instruction.

22. The invention as defined in any one of claims 16, 17 or 18 further including the step of modifying all memory referencing instructions in said loop when a memory referencing instruction has been selected for transformation to an update instruction.

23. The invention as defined in either of claims 19 or 20 further including the step of modifying all memory referencing instructions in said loop when a memory referencing instruction has been selected for transformation to an update instruction.

24. The invention as defined in any one of claims 13, 14 or 15 further including the step of modifying all memory referencing instructions in said loop when a memory referencing instruction has been selected for transformation to an update instruction, said step comprising subtracting the original displacement of said selected referencing instruction from the displacement of each memory referencing instruction to be modified and converting each modified referencing instruction to an update form acceptable to a selected target machine as required.

25. The invention as defined in any one of claims 16, 17 or 18 further including the step of modifying all memory referencing instructions in said loop when a memory referencing instruction has been selected for transformation to an update instruction, said step comprising subtracting the original displacement of said selected referencing instruction from the displacement of each memory referencing instruction to be modified and converting each modified referencing instruction to an update form acceptable to a selected target machine as required.

26. The invention as defined in either of claims 19 or 20 further including the step of modifying all memory referencing instructions in said loop when a memory referencing instruction has been selected for transformation to an update instruction, said step comprising subtracting the original displacement of said selected referencing instruction from the displacement of each memory referencing instruction to be modified and converting each modified referencing instruction to an update form acceptable to a selected target machine as required.

27. The invention as defined in any one of claims 13, 14 or 15 further including the step of modifying all memory referencing instructions in said loop when a memory referencing instruction has been selected for transformation to an update instruction, said step comprising subtracting the original displacement of said selected referencing instruction from the displacement of each memory referencing instruction to be modified and converting each modified referencing instruction to an update form acceptable to a selected target machine as required, said converting comprising adding an update amount to the displacement value of the instruction being modified to convert a post-increment instruction to a pre-increment instruction or a pre-decrement instruction to a post-decrement instruction or subtracting an update amount from said displacement value to convert a post-decrement instruction to a pre-decrement instruction or a pre-increment instruction to a post-increment instruction.

28. The invention as defined in any one of claims 16, 17 or 18 further including the step of modifying all memory referencing instructions in said loop when a memory referencing instruction has been selected for transformation to an update instruction, said step comprising subtracting the original displacement of said selected referencing instruction from the displacement of each memory referencing instruction to be modified and converting each modified referencing instruction to an update form acceptable to a selected target machine as required, said converting comprising adding an update amount to the displacement value of the instruction being modified to convert a post-increment instruction to a pre-increment instruction or a pre-decrement instruction to a post-decrement instruction or subtracting an update amount from said displacement value to convert a post-decrement instruction to a pre-decrement instruction or a pre-increment instruction to a post-increment instruction.

29. The invention as defined in either of claims 19 or 20 further including the step of modifying all memory referencing instructions in said loop when a memory referencing instruction has been selected for transformation to an update instruction, said step comprising subtracting the original displacement of said selected referencing instruction from the displacement of each memory referencing instruction to be modified and converting each modified referencing instruction to an update form acceptable to a selected target machine as required, said converting comprising adding an update amount to the displacement value of the instruction being modified to convert a post-increment instruction to a pre-increment instruction or a pre-decrement instruction to a post-decrement instruction or subtracting an update amount from said displacement value to convert a post-decrement instruction to a pre-decrement instruction or a pre-increment instruction to a post-increment instruction.

30. A method for operating a data processing system to optimize computer code by selecting memory referencing instructions potentially suitable for transformation to update instructions and transforming those instructions, found suitable, to update instructions comprising the steps performed by said data processing system of:
examining all memory referencing instructions in a loop which use a particular induction variable and rejecting all memory referencing instructions not reached on any traversal of said loop reaching an induction variable definition point or reached on any traversal of said loop which does not reach said induction variable definition point and does not exit said loop;
from the remaining memory referencing instructions not rejected, selecting at least one of said remaining memory referencing instructions as candidates for transformation to update instructions;
attempting offset compensation on said memory referencing instructions as required to compensate for said transformation of said selected candidate instructions and, if successful, transforming said candidate instructions into update instructions, and, if unsuccessful, rejecting said candidate instructions; and
repeating said selecting and rejecting process until either at least one memory referencing instruction suitable for transformation has been found or all memory referencing instructions have been rejected.

31. The invention as defined in claim 30 including the further step of rejecting all memory referencing instruction outside a side node where said induction variable update point is in said side node.

32. The invention as defined in claim 30 including the further step of rejecting all memory referencing instructions outside a whirl set node where said induction variable update point is in a whirl set node.

33. The invention as defined in claim 30 including the step of rejecting all memory referencing instructions as candidates which cannot convert to an update instruction form acceptable to a preselected target machine.

34. The invention as defined in claim 30 wherein, when a suitable candidate memory referencing instruction is found, said instruction is transformed into an update instruction and further including the steps of:
creating a new induction variable and inserting an instruction in a preheader to said loop that assigns the value of said original induction variable to said new induction variable;
inserting an instruction in said preheader which adds an amount equal to the displacement of said selected candidate to said new induction variable; and transforming said selected candidate memory referencing instruction into an update instruction on a selected target machine.

35. The invention as defined in claim 34 further including the step of converting said update instruction to a form supported by said selected target machine as required.

36. The invention as defined in claim 35 wherein said step of converting comprises selecting one of the following alternative steps:
   inserting an instruction in said preheader of said loop to subtract an update amount from said new induction variable so as to convert a post-increment instruction to a pre-increment instruction or a pre-decrement instruction to a post-decrement instruction; or
   inserting an instruction in said preheader of said loop to add an update amount from said new induction variable so as to convert a post-decrement instruction to a pre-decrement instruction or a pre-increment instruction to a post-increment instruction.

37. The invention as defined in any one of claims 30, 31 or 32 further including the step of modifying all memory referencing instructions in said loop when a memory referencing instruction has been selected for transformation to an update instruction.

38. The invention as defined in any one of claims 33, 34 or 35 further including the step of modifying all memory referencing instructions in said loop when a memory referencing instruction has been selected for transformation to an update instruction.

39. The invention as defined in claim 36 further including the step of modifying all memory referencing instructions in said loop when a memory referencing instruction has been selected for transformation to an update instruction.

40. The invention as defined in any one of claims 30, 31 or 32 further including the step of modifying all memory referencing instructions in said loop when a memory referencing instruction has been selected for transformation to an update instruction, said step comprising subtracting the original displacement of said selected referencing instruction from the displacement of each memory referencing instruction to be modified and converting each modified referencing instruction to an update form acceptable to a selected target machine as required.

41. The invention as defined in any one of claims 33, 34 or 35 further including the step of modifying all memory referencing instructions in said loop when a memory referencing instruction has been selected for transformation to an update instruction, said step comprising subtracting the original displacement of said selected referencing instruction from the displacement of each memory referencing instruction to be modified and converting each modified referencing instruction to an update form acceptable to a selected target machine as required.

42. The invention as defined in claim 36 further including the step of modifying all memory referencing instructions in said loop when a memory referencing instruction has been selected for transformation to an update instruction, said step comprising subtracting the original displacement of said selected referencing instruction from the displacement of each memory referencing instruction to be modified and converting each modified referencing instruction to an update form acceptable to a selected target machine as required.

43. The invention as defined in any one of claims 30, 31 or 32 further including the step of modifying all memory referencing instructions in said loop when a memory referencing instruction has been selected for transformation to an update instruction, said step comprising subtracting the original displacement of said selected referencing instruction from the displacement of each memory referencing instruction to be modified and converting each modified referencing instruction to an update form acceptable to a selected target machine as required, said converting comprising adding an update amount to the displacement value of the instruction being modified to convert a post-increment instruction to a pre-increment instruction or a pre-decrement instruction to a post-decrement instruction or subtracting an update amount from said displacement value to convert a post-decrement instruction to a pre-decrement instruction or a pre-increment instruction to a post-increment instruction.

44. The invention as defined in any one of claims 33, 34 or 35 further including the step of modifying all memory referencing instructions in said loop when a memory referencing instruction has been selected for transformation to an update instruction, said step comprising subtracting the original displacement of said selected referencing instruction from the displacement of each memory referencing instruction to be modified and converting each modified referencing instruction to an update form acceptable to a selected target machine as required, said converting comprising adding an update amount to the displacement value of the instruction being modified to convert a post-increment instruction to a pre-increment instruction or a pre-decrement instruction to a post-decrement instruction or subtracting an update amount from said displacement value to convert a post-decrement instruction to a pre-decrement instruction or a pre-increment instruction to a post-increment instruction.

45. The invention as defined in claim 36 further including the step of modifying all memory referencing instructions in said loop when a memory referencing instruction has been selected for transformation to an update instruction, said step comprising subtracting the original displacement of said selected referencing instruction from the displacement of each memory referencing instruction to be modified and converting each modified referencing instruction to an update form acceptable to a selected target machine as required, said converting comprising adding an update amount to the displacement value of the instruction being modified to convert a post-increment instruction to a pre-increment instruction or a pre-decrement instruction to a post-decrement instruction or subtracting an update amount from said displacement value to convert a post-decrement instruction to a pre-decrement instruction or a pre-increment instruction to a post-increment instruction.

* * * * *